United States Patent [19]

Aonuma et al.

[11] Patent Number: 5,432,226

[45] Date of Patent: Jul. 11, 1995

[54] RUBBER FORMULATION AND PROCESS FOR PREPARING SAME

[75] Inventors: Mitsuyoshi Aonuma, Tokyo; Shigeru Okamura, Sagamihara, both of Japan; Meyer Soria, Villeurbanne; Paul Branlard, Lyons, both of France

[73] Assignee: Nippon Zeon Co., Ltd., Tokyo, Japan

[21] Appl. No.: 19,189

[22] Filed: Feb. 17, 1993

[30] Foreign Application Priority Data

Feb. 18, 1992 [JP] Japan ................................ 4-069129

[51] Int. Cl.$^6$ ............................................. C08L 83/00
[52] U.S. Cl. ...................................... 524/506; 524/188; 524/262; 524/264; 524/521; 525/100; 525/101
[58] Field of Search ................ 524/188, 264, 262, 101, 524/506, 521; 525/100, 101

[56] References Cited

U.S. PATENT DOCUMENTS 4,992,512 2/1991 Ward et al. ........................ 525/100
5,051,480 9/1991 Coran ................................. 525/227

Primary Examiner—Paul R. Michl
Assistant Examiner—Edward J. Cain
Attorney, Agent, or Firm—Armstrong, Westerman, Hattori, McLeland & Naughton

[57] ABSTRACT

A rubber formulation including (a) a hydrogenated nitrile rubber, (b) an organopolysiloxane, (c) a crosslinking controller selected from (i) an ester or polyester of acrylic or methacrylic acid with a polyhydric alcohol, (ii) an amide or polyamide of acrylic or methacrylic acid with a polyamine, (iii) an alkoxysilane having a C=C double bond, an amino group or a mercapto group and (iv) triallyl isocyanate, (d) an optional filler, and (e) a peroxide crosslinking agent. The rubber formulation is prepared by mixing together (a') a hydrogenated nitrile rubber composition having added therein an optional filler, (b') an organopolysiloxane composition having added therein an optional filler, and (c) the crosslinking controller, and thereafter adding (e) the peroxide crosslinking agent.

14 Claims, No Drawings

RUBBER FORMULATION AND PROCESS FOR PREPARING SAME

BACKGROUND OF THE INVENTION (1) Field of the Invention

This invention relates to a rubber formulation comprising (A) polymer ingredients comprised of (a) a hydrogenated nitrile rubber having a Mooney viscosity of up to 70 and (b) an organopolysiloxane, (B) a compound selected from (i) an unsaturated ester or polyester of acrylic acid or methacrylic acid with a polyhydric alcohol, (ii) an unsaturated amide or polyamide of acrylic acid or methacrylic acid with a polyamine, (iii) an alkoxysilane having a carbon-to-carbon unsaturated bond, amino group or a mercapto group, and (iv) triallyl isocyanurate, (C) an optional filler and (D) a peroxide crosslinking agent; a process for preparing this rubber formulation; and a crosslinked rubber formulation made therefrom.

The crosslinked rubber composition exhibits a good tensile strength, heat resistance, cold resistance and oil resistance, and therefore, is used widely in many industrial and chemical fields.

(2) Description of the Related Art

A silicone rubber has a good release property, heat aging resistance, cold resistance and weatherability, but as is known, the silicone rubber has a poor tensile strength, oil resistance and water resistance. Accordingly, use of the silicone rubber in the field where high mechanical strengths are required or in the field where the silicone rubber is placed in contact with oil or water, is restricted.

A hydrogenated nitrile rubber has a good tensile strength, oil resistance and heat resistance, but the hydrogenated nitrile rubber is not satisfactory in performances capable of coping with severe conditions of heat aging resistance, cold resistance and weatherability.

Accordingly, a combination of a silicone rubber and a hydrogenated nitrile rubber offsets the defects of the two rubbers, and it is expected that a satisfactory rubber formulation will be obtained by mixing together the two rubbers.

As the known technique of mixing a silicone rubber and a hydrogenated nitrile rubber, there can be mentioned a process wherein a silicone rubber is mechanically mixed with a hydrogenated nitrile rubber, as disclosed in German Patent No. 3812354. The mechanical mixing disclosed is a simple mechanical mixing conventionally employed in mixing together rubbers having a good compatibility with each other. However, a hydrogenated nitrile rubber has a poor compatibility with a silicone rubber and has a viscosity much higher than that of the silicone rubber. Therefore, even though the two rubbers are practically kneaded by the above mechanical kneading, it is difficult or even impossible to obtain a homogeneous rubber formulation. Further, the silicone rubber is different from the hydrogenated nitrile rubber in the induction time for the crosslinking reaction and the rate of crosslinking reaction, and therefore, it is difficult to obtain a homogeneous cured rubber product. The cured product of the rubber formulation of the two rubbers has unsatisfactory physical properties, and thus, advantageous characteristics of the two rubbers cannot be manifested.

SUMMARY OF THE INVENTION

It is therefore a primary object of the present invention to provide a crosslinked rubber formulation comprised of a silicone rubber and a hydrogenated nitrile rubber, which exhibits good mechanical properties, heat resistance, cold resistance and oil resistance, by amelioration of the poor mechanical mixing compatibility between a silicone rubber and a hydrogenated nitrile rubber, which is due to the difference of the viscosity between the two rubbers, i.e., by improvement of the dispersibility of the two rubbers, and further by incorporating an appropriate crosslinking controller suitable for peroxide crosslinking.

In accordance with one aspect of the present invention, there is provided a rubber formulation comprising, based on the weight of the formulation:

(A) 100 parts by weight of polymer ingredients comprised of:
  (a) 2 to 98% by weight of a hydrogenated nitrile rubber having a Mooney viscosity of up to 70 and
  (b) 98 to 2% by weight of an organopolysiloxane,
(B) 0.2 to 10 parts by weight of at least one compound selected from:
  (i) an ester or polyester of acrylic acid or methacrylic acid with a polyhydric alcohol, said ester or polyester having at least two carbon-to-carbon unsaturated bonds in the molecule,
  (ii) an amide or polyamide of acrylic acid or methacrylic acid with a polyamine, said amide or polyamide having at least two carbon-to-carbon unsaturated bonds in the molecule,
  (iii) an alkoxysilane having a carbon-to-carbon unsaturated bond, an amino group or a mercapto group in the molecule, and having 1 to 8 carbon atoms in the alkoxy group, and
  (iv) triallyl isocyanurate,
(C) 0 to 200 parts by weight of a filler, and
(D) 0.2 to 10 parts by weight of a peroxide crosslinking agent.

In accordance with another aspect of the present invention, there is provided a process for the preparation of a rubber formulation, which comprises the steps of:

mixing together, (a') a hydrogenated nitrile rubber composition comprising 2 to 98 parts by weight of a hydrogenated nitrile rubber having a Mooney viscosity of up to 70 and 0 to 50 parts by weight, per 100 parts by weight of the hydrogenated nitrile rubber, of a filler;

(b') an organopolysiloxane composition comprising 98 to 2 parts by weight of an organopolysiloxane and 0 to 60 parts by weight, per 100 parts by weight of the organopolysiloxane, of a filler;

the total amount of the hydrogenated nitrile rubber in ingredient (a') and the organopolysiloxane in ingredient (b') being 100 parts by weight;

(b) 0.2 to 10 parts by weight of at least one compound selected from:
  (i) an ester or polyester of acrylic acid or methacrylic acid with a polyhydric alcohol, said ester or polyester having at least two carbon-to-carbon unsaturated bonds in the molecule,
  (ii) an amide or polyamide or acrylic acid or methacrylic acid with a polyamine, said amide or polyamide having at least two carbon-to-carbon unsaturated bonds in the molecule, (iii) an alkoxysilane having a carbon-to-carbon unsaturated bond, an amino group or a mercapto group in the molecule, and having 1 to 8 carbon atoms in the alkoxy group, and (iv) triallyl isocyanurate, and (C) 0 to 200 parts by weight of a filler; the total amount of the fillers in ingredients (a'), (b') and (C) being 0 to 200 parts by weight; and thereafter incorporating in the resultant mixture (D) 0.2 to 10 parts by weight of a peroxide crosslinking agent.

In accordance with a further aspect of the present invention, there is provided a crosslinked rubber formulation which is made by crosslinking the above-mentioned rubber formulation with the peroxide crosslinking agent contained therein.

DESCRIPTION OF THE PREFERRED EMBODIMENTS

The hydrogenated nitrile rubber (a) used in the invention is a partially or completely hydrogenated nitrile rubber having a Mooney viscosity up to 70 as measured at a temperature of 100° C. If a hydrogenated nitrile rubber having a Mooney viscosity higher than 70 is used, the difference of viscosity between the hydrogenated nitrile rubber composition and the organopolysiloxane composition becomes too large, and the dispersibility is degraded. The Mooney viscosity of the hydrogenated nitrile rubber is preferably up to 60, more preferably up to 45.

The partially or completely hydrogenated nitrile rubber used in the invention can be prepared by partially or completely hydrogenating a nitrile rubber according to a known process. The hydrogenation degree of the hydrogenated nitrile rubber can be expressed by the iodine value, and in the present invention, a hydrogenated nitrile rubber having an iodine value not larger than 120, preferably not larger than 60, is generally used.

The hydrogenated nitrile rubber includes a product obtained by hydrogenating an α,β-unsaturated nitrile-conjugated diene copolymer rubber and a product obtained by hydrogenating an α,β-unsaturated nitrile-conjugated diene-ethylenically unsaturated monomer terpolymer rubber.

As specific examples of the α,β-unsaturated nitrile, there can be mentioned acrylonitrile and methacrylonitrile, and as specific examples of the conjugated diene, there can be mentioned 1,3-butadiene, 2,3-dimethylbutadiene, isoprene and 1,3-pentadiene. As specific examples of the ethylenically unsaturated monomer, there can be mentioned vinyl aromatic compounds such as styrene, p-t-butylstyrene and chloromethylstyrene; alkyl esters of unsaturated monocarboxylic acids such as methyl acrylate, methyl methacrylate, ethyl acrylate, ethyl methacrylate, 2-ethylhexyl acrylate and 2-ethylhexyl methacrylate; alkoxyalkyl esters of the above-mentioned unsaturated monocarboxylic acids; dialkyl esters of unsaturated dicarboxylic acids such as dimethyl itaconate, dimethyl maleate and dimethyl fumarate; unsaturated monocarboxylic acids, unsaturated dicarboxylic acids and monoesters thereof, such as acrylic acid, methacrylic acid, maleic acid and monoesters of itaconic acid; and acrylamide and methacrylamide, and N-substituted acrylamide and N-substituted methacrylamide such as N,N-dimethylacrylamide, N,N-dimethylmethacrylamide, N-methoxyethylacrylamide and N-methoxyethylmethacrylamide.

The organopolysiloxane used in the invention is comprised of recurring units of a siloxane having a substituted hydrocarbon group and represented by the following average composition formula:

$$R_aSi_{(4-a)/2}$$

wherein R represents a substituted or unsubstituted hydrocarbon group, and a is a number of from 1 to 3.

As the group R in the formula, there can be mentioned alkyl groups having 1 to 9 carbon atoms such as a methyl group, an ethyl group, a propyl group and a butyl group; aryl groups having 6 to 9 carbon atoms such as a phenyl group and a tolyl group; alkenyl groups having 2 to 9 carbon atoms such as a vinyl group and an allyl group; groups having up to 9 carbon atoms in which at least one hydrogen atom bonded to carbon atoms of these hydrocarbon groups are substituted with a halogen atom, a cyano group or another group; and groups having up to 9 carbon atoms in which at least one hydrogen atom of the alkyl group is substituted with a mercapto group.

The organopolysiloxane used in the invention contains carbon-to-carbon unsaturated bonds preferably at a concentration of at least 100 ppm based on the weight of the organopolysiloxane. If the content of carbon-to-carbon unsaturated bonds is lower than 100 ppm, a crosslinked product of the rubber formulation of the invention has a poor tensile strength. An organopolysiloxane having a carbon-to-carbon unsaturated bond content of at least 200 ppm is more preferably used.

A customarily used hydrogenated nitrile rubber is a rubber having a Mooney viscosity higher than 70, and, in contrast, an organopolysiloxane is a rubber having such a low viscosity that the Mooney viscosity cannot be measured without incorporation of a filler. If these rubbers are mechanically mixed together, the obtained formulation is extremely unsatisfactory in the dispersion state. Therefore, according to the invention, a hydrogenated nitrile rubber having a Mooney viscosity of up to 70 is used as the hydrogenated nitrile rubber and a filler is preferably incorporated in the organopolysiloxane in an amount of up to 60 parts by weight per 100 parts by weight of the organopolysiloxane, whereby a rubber formulation having a good dispersion state can be obtained. If desired, up to 50 parts by weight of a filler can be incorporated in the hydrogenated nitrile rubber per 100 parts by weight of the hydrogenated nitrile rubber. If the amount of the filler incorporated in the hydrogenated nitrile rubber is larger than 50 parts by weight, the viscosity of the formulation becomes too high, the dispersion state is degraded and the mechanical properties of the resulting crosslinked rubber product are deteriorated. Similarly, if the amount of the filler incorporated in the organopolysiloxane is larger than 60 parts, the mechanical properties of the resulting crosslinked product are degraded. Preferably, the filler is incorporated in the hydrogenated nitrile rubber in an amount of up to 40 parts by weight and in the organopolysiloxane in an amount of 30 to 50 parts by weight, respectively. Further, an additional filler can be incorporated provided that the total amount of the fillers is not larger than 200 parts by weight based on 100 parts by weight of the sum of the hydrogenated nitrile rubber and the organopolysiloxane.

As the filler to be incorporated in the organopolysiloxane and the hydrogenated nitrile rubber, reinforcing fillers such as silica and carbon black are preferably used. Anhydrous silica and hydrous silica can be used, but silica having a specific surface area of at least 50 m$^2$g, especially 100 to 400 m$^2$/g, is preferably used. Such silica can be used as it is, or can be used after the surface treatment with an organic silicon compound such as an organochlorosilane, an organoalkoxysilane, an organopolysiloxane or a hexaorganodisilazane.

As other fillers, there can be mentioned inorganic fillers such as quartz powder, diatomaceous earth, zinc oxide, basic magnesium carbonate, active calcium carbonate, magnesium silicate, aluminum silicate, titanium dioxide, talc, mica powder, aluminum sulfate, calcium sulfate, barium sulfate, asbestos and glass fiber; and organic fillers or organic reinforcers such as polyester fiber, polyamide fiber, vinylon fiber and aramid fiber.

The hydrogenated nitrile rubber (a) and the organopolysiloxane (b) are used in a proportion such that the amount of (a) is 98 to 2% by weight, preferably 80 to 20% by weight, and the amount of (b) is 2 to 98% by weight, preferably 20 to 80% by weight, based on the sum of (a) and (b). If the amount of (a) exceeds 98% by weight, i.e., the amount of (b) is smaller than 2% by weight, or the amount of (a) is smaller than 2% by weight, i.e., the amount of (b) exceeds 98% by weight, each of the two ingredients (a) and (b) cannot offset the defects of the other of the ingredients (a) and (b), and a crosslinked rubber formulation having good and well balanced tensile strength, thermal resistance, cold resistance and oil resistance cannot be obtained.

The rubber formulation of the invention contains 0.2 to 10 parts by weight, preferably 0.5 to 10 parts by weight and more preferably 1 to 5 parts by weight, based on 100 parts by weight of the sum of polymer ingredients (a) and (b), of at least one compound selected from the following (i), (ii), (iii) and (iv):

(i) an ester or polyester of acrylic acid or methacrylic acid with a polyhydric alcohol, said ester or polyester having at least two carbon-to-carbon unsaturated bonds in the molecule, (ii) an amide or polyamide of acrylic acid or methacrylic acid with a polyamine, said amide or polyamide having at least two carbon-to-carbon unsaturated bonds in the molecule, (iii) an alkoxysilane having a carbon-to-carbon unsaturated bond, an amino group or a mercapto group in the molecule, and having 1 to 8 carbon atoms in the alkoxy group, and (iv) triallyl isocyanurate.

If the amount of these compounds is smaller than 0.2 part by weight, the mechanical properties of the resulting cross-linked rubber formulation are improved only to a minor extent, and in contrast, if the amount thereof is larger than 10 parts by weight, a crosslinked rubber formulation having well balanced rubber characteristics such as tensile strength and elongation cannot be obtained.

As specific examples of the ester or polyester of acrylic acid or methacrylic acid with a polyhydric alcohol, which has at least two carbon-to-carbon unsaturated bonds in the molecule, there can be mentioned ethylene glycol diacrylate, ethylene glycol dimethacylate, 1,3-butanediol diacrylate, 1,3-butanediol dimthacrylate, 1,4-butanediol diacrylate, 1,4-butanediol dimetharylate, 1,6-hexanediol diacrylate, 1,6-hexanediol dimethacrylate, polyethylene glycol diacrylate, polyethylene glycol dimethacrylate, 2,2'-bis(4-methacryloyldiethoxyphenyl)propane, trimethylolpropane triacrylate, trimethylolpropane trimethacylate, pentaerythritol triacrylate and pentaerythritol trimethacrylate.

As specific examples of the amide of polyamide of acrylic acid or methacrylic acid with a polyamine, which has at least two carbon-to-carbon unsaturated bonds in the molecule, there can be mentioned N,N'-methylene-bis-acrylamide, N,N'-methylene bis-methacrylamide, N,N'-ethylene-bis-acrylamide, N,N'-ethylene-bis-methacrylamide and bismaleimide.

As specific examples of the alkoxysilane having a carbon-to-carbon unsaturated bond, an amino group or a mercapto group in the molecule, there can be mentioned amino-substituted alkoxysilanes such as γ-(2-aminoethyl)aminopropyltrimethoxysilane, γ-(2-aminoethyl)aminopropylmethyldimethoxysilane, γ-aminopropyltriethoxysilane, N-phenyl-γ-aminopropyltrimethoxysilane, γ-ureidopropyltriethoxysilane, γ-(2-ureidethyl)aminopropyltrimethoxysilane and γ-dibutylaminopropyltrimethoxysilane; alkoxysilanes having a carbon-to-carbon double bond-containing substituent such as γ-methacryloxypropyltrimethoxysilane, N-β-(N-vinylbenzylaminoethyl)-γ-aminopropyltrimethoxysilane, vinyltrimethoxysilane, vinyltriethoxysilane, norbornyltrimethoxysilane, γ-diallylaminopropyltrimethoxysilane and γ-methacryloxypropylmethyldimethoxysilane; and mercapto-substituted akoxysilanes such as γ-mercaptopropyltrimethoxysilane and γ-mercaptopropylmethyldimethoxysilane.

The rubber formulation of the invention further contains 0.2 to 10 parts by weight, preferably 0.3 to 10 parts by weight and more preferably 0.3 to 5 parts by weight, based on 100 parts by weight of the sum of the polymer ingredients (a) and (b), of a peroxide crosslinking agent. If the amount of the peroxide crosslinking agent is smaller than 0.2 part by weight, the crosslinking is insufficient and the crosslinked rubber product has a poor strength. If the amount of the peroxide exceeds 10 parts by weight, the degree of crosslinking is undesirably large and the crosslinked rubber product has a poor elongation.

As specific examples of the peroxide crosslinking agent used in the invention, there can be mentioned 2,5-dimethyl-2,5-di(t-butylperoxy)hexine-3, 2,5-dimethyl-2,5-di(t-butylperoxy)hexane, 2,2-bis(t-butylperoxy)-p-diisopropylbenzene, dicumyl peroxide, di-ti-butyl peroxide, t-butyl perbenzoate, 1,1-bis(t-butylperoxy)-3,3,5-trimethylcyclohexane, benzoyl peroxide, 2,4-dichlorobenzoyl peroxide, p-chlorobenzoyl peroxide, 2,4-dicumyl peroxide, dialkyl peroxides and ketal peroxide.

The process for the preparation of the rubber formulation of the invention is not particularly limited, and an ordinary preparation process adopted for mixing rubbers can be adopted. In general, the hydrogenated nitrile rubber is kneaded with an optional filler, and separately, the organopolysiloxane is mixed with an optional filler. Then the resulting two mixtures are kneaded together with a predetermined amount of (i) the ester or polyester of acrylic acid or methacrylic acid with a polyhydric alcohol, which has at least two carbon-to-carbon unsaturated bonds, or (ii) the amide of polyamide of acrylic acid or methacrylic acid with a polyamine, which has at least two carbon-to-carbon unsaturated bonds in the molecule, or (iii) the alkoxysilane having a carbon-to-carbon unsaturated bond, an amino group or a mercapto group in the molecule, or (iv) triallyl isocyanurate. Thereafter, a peroxide crosslinking agent is kneaded together with the resultant mixture by using, for example, a roll.

Preferably, the above-mentioned ingredients (i), (ii), (iii) and/or (iv) are previously mixed with the hydrogenated nitrile rubber/optional filler mixture and/or the organopolysiloxane/optical filler mixture. When the alkoxysilane having a carbon-to-carbon unsaturated bond is used, if is preferably that this alkoxysilane is mixed together with the organopolysiloxane having incorporated therein silica as a filler. The resulting crosslinked rubber product has excellent rubber characteristics. When the ester or polyester of acrylic acid or methacrylic acid with a polyhydric alcohol or the amide or polyamide of acrylic acid or methacrylic acid with a polyamine is used, any filler can be advantageously used.

When the hydrogenated nitrile rubber composition is mixed with the organopolysiloxane composition, the mixing is preferably carried out so that the ratio of the shear viscosity of the hydrogenated nitrile rubber composition to the shear viscosity of the organopolysiloxane composition is in the range of from 1/5 to 5/1. This viscosity ratio means the ratio of the shear viscosities of the two compositions as measured at the temperature practically adopted at the mixing step. If this viscosity ratio of the two compositions is lower than 1/5 or higher than 5/1, the dispersion state is not good and the mechanical properties of the resulting crosslinked product are degraded. This viscosity ratio can be attained by lowering the Mooney viscosity of the hydrogenated nitrile rubber below 60 and incorporating a filler in the organopolysiloxane in an amount of up to 60 parts, and preferably further incorporating a filler in the hydrogenated nitrile rubber in an amount of up to 50 parts. The viscosity ratio of the two compositions is preferably in the range of from 0.4 to 2.5.

The preparation of the rubber formulation of the invention can be performed by using an open type kneader such as a mixing roll, a closed type kneader such as a Brabender mixer or a Banbury mixer, or a continuous kneader such as a single-screw extruder, a twin-screw extruder, a Farrel mixer or a Buss cokneader. Preferably the preparation temperature is in the range from room temperature to 300° C. The crosslinking agent is preferably added at a temperature from room temperature to 120° C. to the rubber formulation so as to control decomposition of the peroxide crosslinking agent.

The rubber formulation of the invention is comprised of the above-mentioned ingredients (A), (B), (C) and (D), but known additives customarily used for rubbers can be added to the rubber formulation of the invention.

For example, metal oxides, amines, fatty acids and derivatives thereof can be used as a processing assistant, and polydimethylsiloxane oils, diphenylsilane diols, trimethylsilanols, phthalic acid derivatives, adipic acid derivatives and trimellitic acid derivatives can be used as a plasticizer. Furthermore, there can be used lubricating oils, process oils, coal tar, castor oil and calcium stearate as a softener, and there can be used phenylenediamines, phosphates, quinolines, cresols, phenols and metal dithiocarbamates as an anti-aging agent. Still further, heat-resisting agents such as iron oxide, cesium oxide, potassium hydroxide, iron naphthenate and potassium naphthenate can be used, and a lubricant, a tackifier, a scorch-preventing agent, a crosslinking promoter, a crosslinking assistance, a promoter assistant, a cross-linking-retarding agent, a colorant, an ultraviolet absorber, a flame retardant, an oil resistance improver, a foaming agent and others can optionally be used.

Additives such as mentioned above can be added in the course of preparing the rubber formulation of the present invention according to need.

A useful crosslinked rubber product is obtained by crosslinking the rubber formulation of the invention. Crosslinking is effected by the peroxide. Ordinary peroxide crosslinking conditions for rubbers can be adopted in the invention. In general, crosslinking is carried out at a temperature of 100° to 250° C. under a pressure of 0 to 300 kg/cm$^2$ for 5 seconds to 10 hours (including the post-crosslinking time). These crosslinking conditions can be attained by irradiation with energy rays such as thermal rays, electron beams, ultraviolet rays and electromagnetic waves.

Crosslinking of the rubber formulation of the invention is performed by customary procedures, for example, by batch-wise curing utilizing press molding, transfer molding, injection molding or vulcanizer molding, or by continuous curing utilizing a hot chamber, a pressure tube, a curing funnel, a salt bath, a fluidized bed or a high-frequency heater.

In the rubber formulation of the present invention, the viscosity of the hydrogenated nitrile rubber is controlled to a low level and a filler is preferably incorporated in the organopolysiloxane and, if desired, further in the hydrogenated nitrile rubber. Therefore, the homogeneous dispersibility of the hydrogenated nitrile rubber and the organopolysiloxane can be increased. Namely, the rubber formulation of the invention is different from a known simple mixture of a hydrogenated nitrile rubber and a silicone rubber in that the mechanical kneadability between the two rubber components is improved, and therefore, the dispersibility is highly improved. Furthermore, although a long time is required for winding up the simple mixture on a roll, the rubber formulation of the invention can be promptly wound up on a roll and the roll processability can be highly improved.

Moreover, the crosslinked rubber composition obtained by crosslinking the rubber formulation of the invention has good mechanical properties represented by the tensile strength, and exhibits a good heat resistance, cold resistance and oil resistance. This is because the rubber formulation of the invention contains the ingredient (B), i.e., a crosslinking agent.

The rubber formulation of the invention having such good properties can be widely used in the fields of mineral industries and the fields of chemical industries. Especially, the rubber formulation of the present invention can be valuably used as hoses, for examples, automobile hydraulic pressure hoses, automobile air hoses and automobile radiator hoses, which are used in contact with a solvent, an oil, water or air, hydraulic pressure hoses of various machines such as construction machines and processing machines, seals such as O-rings, packings, gaskets and oil seals, boots such as uniform motion boots, diaphragms, cables, caps, rolls and belts.

The invention will now be specifically described with reference to the following examples which illustrate only embodiments of the invention and by no means limit the scope of the invention.

In the examples and comparative examples, "parts" and "%" are by weight unless othewise specified.

Hydrogenated nitrile rubbers used in the examples and comarative examples are as follows.

HNBR-1 (L-ML):

A hydrogenated nitrile rubber having a Mooney viscosity of 45 at 100° C., an iodine value of 28, a bound acrylonitrile content of 36%.

HNBR-2 (H-ML):

A hydrogenated nitrile rubber having a Mooney viscosity of 78 at 100° C., an iodine value of 27 and a bound acrylonitrile content of 36%, Zetpol 2020 supplied by Nippon Zeon.

HNBR Composition 1 (20):

A composition prepared by mixing 20 parts of Aerosil #200, supplied by Degussa, with a hydrogenated nitrile rubber having a Mooney viscosity of 25 at 100° C., an iodine value of 28 and a bound acrylonitrile content of 36%, by a 6-inch roll.

HNBR Composition 2 (40):

A composition prepared by mixing 40 parts of Aerosil #200 with the same HNBR as used for the HNBR composition 1 (20) by a 6-inch roll.

HNBR Composition 3 (20):

A composition prepared by mixing 60 parts of Aerosil #200 with the same HNBR as used for the HNBR composition 1 (20) by a 6-inch roll.

HNBR Composition 4 (20):

A composition prepared by mixing 20 parts of Aerosil #200, supplied by Degussa, with a hydrogenated nitrile rubber having a Mooney viscosity of 35 at 100° C., an iodine value of 60 and a bound acrylontrile content of 36% by a 6-inch roll.

HNBR Composition 5 (20):

A composition prepared by mixing 20 parts of Aerosil #200, supplied by Degussa, with a hydrogenated nitrile rubber having a Mooney viscosity of 38 at 100° C., an iodine value of 5 and a bound acrylonitrile content of 36% by a 6-inch roll.

HNBR Composition 6 (CB 20):

A composition prepared by mixing 20 parts of HAF carbon black with the same HNBR as used for the HNBR composition 1 (20) by a 6-inch roll.

NBR used in the examples and comparative examples is as follows.

NBR Composition 1 (20):

A composition prepared by mixing 20 parts of Aerosil #200 with an NBR having a bound acrylonitrile content of 36% and a Mooney viscosity of 36 at 100° C. by a 6-inch roll.

Organopolysiloxanes used in the examples and comparative examples are as follows.

Silicone Rubber Composition 1 (20):

A composition prepared by mixing 20 parts of Aerosil #200 with a polydimethylsiloxane rubber having a carbon-to-carbon unsaturated bond content of 470 ppm by a 1.8 liter Banbury mixer.

Silicone Rubber Composition 2 (50):

A composition prepared by mixing 50 parts of Aerosil #200 with the same polydimethylsiloxane rubber as used for the silicone rubber composition 1 (20) by a 1.8 liter Banbury mixer.

Silicone Rubber Composition 3 (50):

A composition prepared by mixing 50 parts of Aerosil #200 with a polydimethylsiloxane having a carbon-to-carbon unsaturated bond content of 800 ppm by a 1.8 liter Banbury mixer.

The ingredients (B) used in the examples and comparative examples are as follows.

Vinylsilane: γ-methacryloxypropyltrimethoxysilane
TMPT: trimethololpropane trimethacrylate
Aminosilane: γ-(2-aminoethyl)aminopropyltrimethoxysilane
MBA: N,N'-methlene-bis-methacrylamide
TAIC: triallyl isocyanurate
MPSi: γ-mercaptopropyltrimethoxysilane Peroxides and anti-aging agents used in the examples and comparative examples are as follows.

Peroxide 1: Perbutyl P supplied by Nippon Oil and Fat.

Peroxide 2: Perhexa 2.5 B supplied by Nippon Oil and Fat.

Anti-agent 1: Iruganox 1010 supplied by Ciba-Geigy.

The rubber formulation of the invention was press-cured at 170° C. for 25 minutes and then the physical properties were evaluated according to JIS K-6301.

The formulation of the invention was cured, and the dispersion state was observed by a transmission type electron microscope and the dispersed particle size was measured.

The shear vicosities of the HNBR composition and silicone rubber composition were determined with a capillary having a diameter of 1.5 mm at a temperature of 150° C. and a shear rate of 80 $sec^{-1}$ by using a melt processability tester supplied by Monsanto, and the ratio of the shear viscosities was determined as the shear viscosity ratio of the rubber formulation of the invention.

EXAMPLES 1 THROUGH 3

HNBR 1 (L-ML) having a Mooney viscosity of 45 and silicone rubber composition 1 (20) having previously incorporated therein vinylsilane were kneaded together at a temperature of 150° C. and a rotation number of 50 ppm for 15 minutes by using an electric heating type laboplasto-mill supplied by Toyo Seiki, which is a closed type kneader having an inner capacity of 580 ml and equipped with Branbury blades. The shear rate adopted for this kneading was about 80 $sec^{-1}$. The kneaded mixture was wound up on a 6-inch roll maintained at room temperature and peroxide 1 was kneaded into the sheet to obtain a rubber formulation. The mixing ratios adopted in Examples 1 through 3 are shown in Table 1. The thus-prepared rubber formulations were press-cured under the above-mentioned conditions to obtain sheets having a thickness of 2 mm. The obtained sheets were subjected to the hardness test, tensile test, tearing test and dispersibility test using a transmission electron microscope. The results are shown in Table 1.

COMPARATIVE EXAMPLES 1 THROUGH 8

Rubber formulations were prepared according to the recipes shown in Table 1 under the same conditions as described in Example 1, and they were tested and evaluated in the same manner as described in Example 1. The results are shown in Table 1.

In each of Examples 1 through 3, the composition could simply be wound up on the roll within one minute, but in each of Comparative Examples 4 through 6, the composition could not easily be wound up on the roll and more than 5 minutes were necessary. Thus, it was confirmed that the comparative compositions had a poor roll processability at the incorporation step of the peroxide.

TABLE 1

|  | Examples | | | Comparative Examples | | | | | | | |
|---|---|---|---|---|---|---|---|---|---|---|---|
|  | 1 | 2 | 3 | 1 | 2 | 3 | 4 | 5 | 6 | 7 | 8 |
| Recipe (parts) *1 | | | | | | | | | | | |
| HNBR 1 (L-M) (0) | 30 | 50 | 70 | 100 | — | — | — | — | — | — | — |
| HNBR 2 (H-ML) (0) | — | — | — | — | 100 | — | 30 | 50 | 70 | 50 | 70 |
| Si. Rub. Compn 1 (20) | 70 | 50 | 30 | — | — | 100 | 70 | 50 | 30 | 50 | 30 |
| Vinylsilane | 2 | 2 | 2 | — | — | — | 2 | 2 | 2 | — | — |
| Peroxide-1 | 1.5 | 1.5 | 1.5 | 2.5 | 2.5 | 0.5 | 1.5 | 1.5 | 1.5 | 1.5 | 1.5 |
| Properties | | | | | | | | | | | |
| Hardness JIS A | 34 | 38 | 42 | 45 | 49 | 25 | 34 | 41 | 42 | 39 | 42 |
| Tensile strength MPa | 6.5 | 8.5 | 10.3 | 9.3 | 9.7 | 1.3 | 3.4 | 4.1 | 7.2 | 2.7 | 6.7 |
| Elongation % | 230 | 390 | 410 | 510 | 330 | 260 | 200 | 27b | 300 | 290 | 340 |
| 100% Stress MPa | 0.8 | 1.0 | 1.0 | 0.9 | 1.0 | 0.6 | 0.8 | 1.0 | 1.0 | 0.9 | 0.9 |
| Tear strength kN/m | 8 | 13 | 12 | 14 | 14 | 7 | 7 | 7 | 11 | 8 | 10 |
| Dispersed phase *2 | N | N/Q | Q | — | — | — | N | N | Q | N | Q |
| Dis. ptl. dia. *3 μm | 3 | 3 | 2 | — | — | — | 27 | 30 | 7 | 26 | 8 |

*1 A numeral within each parenthesis means the amount of the filler
*2 N: Hydrogenated nitrile rubber, Q: Silicone rubber
*3 Dispersed particle diameter In Table 1, there are shown the results obtained in Examples 1 through 3 wherein filler-free pure rubber HNBR 1 (L-ML) having a Mooney viscosity of 45 and silicone rubber composition 1 (20) having 20 parts of silica incorporated therein were mixed together at a weight ratio of from 30/70 to 70/30. When the compositions of these examples were compared with the compositions of Comparative Examples 4 through 6 using HNBR 2 (H-ML) having a Mooney viscosity outside the range specified in the present invention, it as seen that the compositions of the examples wee superior to the compositions of the comparative examples in all of tensile strength, 100% stress and tear strength.

It is understood that if HNBR is mixed with a silicone rubber according to the conventional technique, as shown in Comparative Examples 7 and 8, the tensile strength and tear strength are lower than the additivity values of the two rubber compositions, but if HNBR having a Mooney viscosity of up to 70 and vinylsilane are used according to the present invention, values exceeding the additivity values can be obtained over a broad range of the mixing ratio of HNBR and the silicone rubber.

Comparison of Comparative Examples 5 and 6 with Comparative Examples 7 and 8 shows that tensile strength was somewhat improved in Comparative Examples 5 and 6 wherein vinylsilane was used. But, this improvement was minor as compared with that attained by the invention. In the invention, a satisfactory strength was obtained because the Mooney viscosity of HNBR was 45 and the vinylsilane was incorporated.

Furthermore, as is apparent from the results of the dispersibility evaluation test using the transmission electron microscope, in the examples of the invention, the dispersed particle size was much smaller than that in the comparative examples and thus a good dispersibility was attained. HNBR and a silicone rubber are remarkably different in the polarity, and therefore, the affinity is very low. Moreover, the difference of the melt viscosity between commercially available HNBR and silicone rubber is extremely large, and hence, if they are mixed together, the dispersion state is generally bad as shown in the comparative examples, and the obtained formulation has a poor practicality. It is understood that if HNBR having a Mooney viscosity of up to 70 is used according to the invention, the dispersibility can be improved.

As is seen from the foregoing description, the formulation of the invention manifests good mechanical properties by curing molding.

EXAMPLES 4 THROUGH 8

HNBR composition 1, HNBR composition 2, HNBR composition 3, silicone rubber composition 1, silicone rubber composition 2, TMPT and peroxide 1 were mixed at ratios shown in Table 2, and compounding, cure molding and test were carried out under the same conditions as adopted in Examples 1 through 3. The TMPT was previously mixed with the silicone rubber composition. The shear viscosity ratio was determined in the above-mentioned manner. The test results are shown in Table 2.

In Examples 4 through 8, silica was previously mixed with each of the HMBR and the silicone rubber.

COMPARATIVE EXAMPLE 9

A rubber formulation was prepared according to the recipe shown in Table 2 under the same conditions as described in Examples 1 to 3 and evaluated. The results are shown in Table 2.

TABLE 2

|  | Examples | | | | | Com. Ex. |
|---|---|---|---|---|---|---|
|  | 4 | 5 | 6 | 7 | 8 | 9 |
| Recipe (parts) *1 | | | | | | |
| HNBR composition 1 (20) | 70 | 70 | — | — | — | — |
| HNBR composition 2 (40) | — | — | 70 | 70 | — | — |
| HNBR composition 3 (60) | — | — | — | — | 70 | 70 |
| Silicone rubber compn 1 (20) | 30 | — | 30 | — | — | 30 |
| Silicone rubber compn 2 (50) | — | 30 | — | 30 | 30 | — |
| TMPT | 4 | 4 | 4 | 4 | 4 | — |
| Peroxide 1 | 1.5 | 1.5 | 1.5 | 1.5 | 1.5 | 1.5 |
| Properties | | | | | | |
| Shear viscosity ratio *2 | 1.9 | 1.1 | 4.3 | 2.7 | 5.3 | 9.3 |
| Hardness JIS-A | 60 | 66 | 71 | 75 | 79 | 76 |

TABLE 2-continued

|  | Examples | | | | | Com. Ex. |
| --- | --- | --- | --- | --- | --- | --- |
|  | 4 | 5 | 6 | 7 | 8 | 9 |
| Tensile strength MPa | 14.8 | 17.1 | 14.3 | 21.9 | 15.2 | 10.7 |
| Elongation % | 380 | 360 | 320 | 330 | 220 | 290 |
| 100% Stress MPa | 2.6 | 3.5 | 3.8 | 4.3 | 6.4 | 3.4 |
| Tear strength kN/m | 12 | 14 | 16 | 15 | 12 | 11 |

*1 A numeral within each parenthesis means the amount of the filler
*2 as measured at 150° C. and 80 sec$^{-1}$ When Examples 4 to 8 wherein TMPT was used are compared with Comparative Example 9 wherein TMPT was not used, it is seen that the products of Examples 4 to 8 were improved over the product of Comparative Example 9 in tensile strength, elongation and tear strength.

In general, when a reinforcing filler such as Aerosil #200 is incorporated in HNBR and a silicone rubber, the tensile strength, 100% stress and tear strength of the formulation are improved with an increase in the amount of the filler, but the difference of the viscosity between the HNBR composition and the silicone rubber composition becomes too large, and it is apprehended that the properties of the cured product of the formulation will be degraded. Practically, in the formulation system of the HNBR composition and the silicone rubber composition, as shown in Examples 4 through 7, if the shear viscosity ratio between the two compositions is in the range of from 0.2 to 5, the cured product of this formulation system is most highly improved in the tensile strength and tear strength characteristics. Especially in the case where the amount of silica incorporated in the HNBR composition is about 40 parts and the amount of silica incorporated in the silicone rubber composition is about 50 parts, the tensile strength is prominently improved.

EXAMPLES 9 THROUGH 13

Predetermined amounts of HNBR composition, silicone rubber composition, aminosilane, TMPT, anti-aging agent and peroxide shown in Table 3 were prepared. At first, the HNBR composition, silicone rubber composition, aminosilane, TMPT and anti-aging agent were mixed together by a plastomill. The entire amount of the aminosilane was previously incorporated in the silicone rubber composition. One half of the TMPT was previously incorporated in the HNBR composition and the other half was previously incorporated in the silicone rubber composition. Then, the peroxide was incorporated by a roll. The mixture was cure-molded and the physical properties of the molded product were tested. The mixing, compounding, cure molding and evaluation were carried out under the same conditions as adopted in Examples 1 through 3. The heat-aging resistance test was carried out by aging the sample at 175° C. for 72 hours in a gear oven, and evaluating the tensile properties. The oil resistance test was carried out by immersing the sample in JIS #3 oil at 150° C. for 70 hours and evaluating the tensile properties. The cold resistance was evaluated by a Gehman tortional tester. The results are shown in Table 3.

COMPARATIVE EXAMPLES 10 TO 12

According to recipes shown in Table 3, ingredients were mixed and compounded, and the formulations were molded and evaluated under the same conditions as described in Examples 1 through 3. The results are shown in Table 3.

When Examples 9, 11 and 12 are compared with Comparative Example 10, it is seen that in Examples 9, 11 and 12 where the iodine value was within the range claimed in the invention, the tensile strength, elongation, aging resistance and cold resistance were improved. In contrast, in Comparative Example 10 where the iodine value was 280, that is, outside the range claimed in the invention, the physical properties of the cured product were drastically degraded, and the additivity effect of different rubbers was not obtained except in the cold resistance.

In the cured product of the rubber formulation of the invention, as the iodine value becomes small, the resistance to heat aging is drastically improved although the tensile strength, oil resistance and cold resistance are not substantially changed.

If the results of Examples 10 and 11 wherein the carbon-to-carbon unsaturated bond contents in the silicone rubbers are different from each other are compared with each other, it is seen that each of the formulations of these examples within the scope of the invention showed good physical properties, but in Example 10 where the carbon-to-carbon unsaturated bond content in the silicone rubber was lower, the elongation retention ratio after heat-aging was higher.

In Example 13, carbon black was used as the filler. It is seen that even if carbon black is used as the filler in the rubber formulation of the invention, good physical properties are manifested after cure molding.

TABLE 3

|  | Examples | | | | | Comp. Ex. | | |
| --- | --- | --- | --- | --- | --- | --- | --- | --- |
|  | 9 | 10 | 11 | 12 | 13 | 10 | 11 | 12 |
| Recipe (parts) *1 | | | | | | | | |
| HNBR composition-4 (20) | 50 | — | — | — | — | — | — | — |
| HNBR composition-1 (20) | — | 50 | 50 | — | — | — | 100 | — |
| HNBR composition-5 (20) | — | — | — | 50 | — | — | — | — |
| HNBR composition-6 (CB 20) | — | — | — | — | 50 | — | — | — |
| NBR composition-1 (20) | — | — | — | — | — | 50 | — | — |
| Silicone rub. compn-2 (50) | — | 50 | — | — | — | — | — | — |
| Silicone rub. compn-3 (50) | 50 | — | 50 | 50 | 50 | 50 | — | 100 |
| Aminosilane | 1 | 1 | 1 | 1 | 1 | 1 | — | — |
| TMPT | 3 | 3 | 3 | 3 | 3 | 3 | — | — |
| Anti-aging agent-1 | 1 | 1 | 1 | 1 | 1 | 1 | 1 | 1 |
| Peroxide-2 | 1.5 | 1.5 | 1.5 | 1.5 | 1.5 | 0.6 | 2.5 | 0.5 |

TABLE 3-continued

|  | Examples | | | | | Comp. Ex. | | |
| --- | --- | --- | --- | --- | --- | --- | --- | --- |
|  | 9 | 10 | 11 | 12 | 13 | 10 | 11 | 12 |
| Properties | | | | | | | | |
| Initial properties | | | | | | | | |
| Hardness JIS A | 66 | 65 | 64 | 65 | 62 | 72 | 60 | 62 |
| Tensile strength MPa | 14.1 | 14.0 | 15.1 | 15.7 | 13.9 | 11.0 | 27.0 | 9.8 |
| Elongation % | 270 | 310 | 300 | 340 | 310 | 180 | 550 | 580 |
| Heat aging resistance *2 | | | | | | | | |
| Tensile strength MPa | 4.9 | 8.1 | 10.0 | 12.7 | 6.1 | Broken | 7.8 | 8.3 |
| Elongation % | 30 | 110 | 90 | 210 | 80 | — | 70 | 540 |
| Oil resistance *3 | | | | | | | | |
| Volume change % | 27 | 29 | 28 | 28 | 25 | 23 | 22 | 39 |
| Cold resistance *4 | | | | | | | | |
| $T_6$ °C. | −31 | −32 | −33 | −32 | −30 | −27 | −23 | −45 |
| $T_{100}$ °C. | −49 | −51 | −52 | −51 | −49 | −45 | −32 | −55 |

*1 A numeral within each parenthesis means the amount of the filler
*2 Aging at 175° C. for 70 hours in a gear oven
*3 Immersion in JIS #3 oil at 150° C. for 70 hours
*4 Torsional test

EXAMPLES 14 THROUGH 17

Predetermined amounts of HNBR composition, silicone rubber composition, TMPT, MBA, TAIC, MPSi, anti-aging agent and peroxide shown in Table 4 were prepared. At first, the HNBR composition, silicone rubber composition, TMPT, MBA, TAIC, MPSi and anti-aging agent were mixed together by a plastomill. The entire amount of the MPSi was previously incorporated in the silicone rubber composition. One half of each of the TMPT, MBA and TAIC was previously incorporated in the HNBR composition and the other half was previously incorporated in the silicone rubber composition. Then, the peroxide was incorporated by a roll. The mixture was cure-molded and the physical properties of the molded product were tested. The mixing, compounding, cure molding and evaluation were carried out under the same conditions as adopted in Examples 9 through 13. The results are shown in Table 4.

In Examples 14 through 17 wherein TMTP, MBA, TAIC or MPSi was used as a crosslinking controller, all of these examples resulted in crosslinked compositions having good tensile strength, elongation, heat aging resistance and cold resistance, which are similar to those obtained in Example 11.

TABLE 4

|  | Examples | | | |
| --- | --- | --- | --- | --- |
|  | 14 | 15 | 16 | 17 |
| Recipe (parts) *1 | | | | |
| HNBR composition-1 (20) | 50 | 50 | 50 | 50 |
| Silicone rub. compn-3 (50) | 50 | 50 | 50 | 50 |
| TMPT | 4 | — | — | — |
| MBA | — | 4 | — | — |
| TAIC | — | — | 4 | — |
| MPSi | — | — | — | 1.5 |
| Anti-aging agent-1 | 1 | 1 | 1 | 1 |
| Peroxide-1 | 1.5 | 1.5 | 1.5 | 1.5 |
| Properties | | | | |
| Initial properties | | | | |
| Hardness JIS A | 65 | 66 | 64 | 62 |
| Tensile strength MPa | 14.8 | 14.1 | 14.4 | 13.2 |
| Elongation % | 310 | 280 | 330 | 350 |
| Heat aging resistance *2 | | | | |
| Tensile strength MPa | 9.1 | 8.2 | 9.7 | 7.9 |
| Elongation % | 100 | 70 | 130 | 60 |
| Oil resistance *3 | | | | |
| Volume change % | 26 | 29 | 28 | 30 |
| Cold resistance *4 | | | | |
| $T_6$ °C. | −32 | −32 | −33 | −33 |
| $T_{100}$ °C. | −52 | −51 | −51 | −49 |

*1 A numeral within each parenthesis means the amount of the filler
*2 Aging at 175° C. for 72 hours in a gear oven
*3 Immersion in JIS #3 oil at 150° C. for 70 hours
*4 Torsional test

What is claimed is:

1. A rubber formulation comprising, based on the weight of the formulation:
   (A) 100 parts by weight of polymer ingredients consisting essentially of:
      (a) 2 to 98% by weight of a hydrogenated nitrile rubber having a Mooney viscosity of up to 70 as measured at 100° C., and
      (b) 98 to 2% by weight of an organopolysiloxane containing at least 100 ppm, based on the weight of the organopolysiloxane, of carbon-to-carbon unsaturated bonds,
   (B) 0.2 to 10 parts by weight of at least one compound selected from the group consisting of:
      (i) an ester or polyester of acrylic acid or methacrylic acid with a polyhydric alcohol, said ester or polyester having at least two carbon-to-carbon unsaturated bonds in the molecule,
(ii) an amide or polyamide of acrylic acid or methacrylic acid with a polyamine, said amide or polyamide having at least two carbon-to-carbon unsaturated bonds in the molecule,
(iii) an alkoxysilane having a carbon-to-carbon unsaturated bond, an amino group or a mercapto group in the molecule, and having 1 to 8 carbon atoms in the alkoxy group, and
(iv) triallyl isocyanurate,
(C) 0 to 200 parts by weight of a filler, and
(D) 0.2 to 10 parts by weight of a peroxide crosslinking agent,
wherein said organopolysiloxane is comprised of recurring units of a siloxane represented by the following average composition formula:

$$R_aSi_{(4-a)/2}$$

wherein R represents a substituted or unsubstituted hydrocarbon, and a is a number of from 1 to 3.

2. A rubber formulation as claimed in claim 1 wherein said hydrogenated nitrile rubber has an iodine value not larger than 120.

3. A rubber formulation as claimed in claim 1 wherein said hydrogenated nitrile rubber has a Mooney viscosity of up to 60 as measured at 100° C.

4. A rubber formulation as claimed in claim 1 wherein said hydrogenated nitrile rubber is selected from the group consisting of hydrogenation products of $\alpha,\beta$-unsaturated nitrile-conjugated diene copolymer rubbers and hydrogenation products of $\alpha,\beta$-unsaturated nitrile-conjugated diene-ethylenically unsaturated monomer terpolymer rubbers.

5. A rubber formulation as claimed in claim 1 wherein said polymer ingredients are comprised of 20 to 80% by weight of the hydrogenated nitrile rubber (a) and 80 to 20% by weight of the organopolysiloxane.

6. A rubber formulation as claimed in claim 1 wherein said filler is selected from the group consisting of silica and carbon black.

7. A rubber formulation as claimed in claim 1 wherein the amount of said compound (B) selected from the group consisting of said compounds (i), (ii), (iii) and (iv) is 0.5 to 10 parts by weight per 100 parts by weight of the polymer ingredients (A).

8. A process for the preparation of a rubber formulation, which comprises the steps of:
mixing together,
(a') a hydrogenated nitrile rubber composition comprising 2 to 98 parts by weight of a hydrogenated nitrile rubber having a Mooney viscosity of up to 70 as measured at 100° C. and 0 to 50 parts by weight, based on 100 parts by weight of the hydrogenated nitrile rubber, of a filler,
(b') an organopolysiloxane composition comprising 98 to 2 parts by weight of an organopolysiloxane and 0 to 60 parts by weight, based on 100 parts by weight of the organopolysiloxane, of a filler; the total amount of the hydrogenated nitrile rubber in ingredient (a') and the organopolysiloxane in ingredient (b') being 100 parts by weight,
(B) 0.2 to 10 parts by weight of at least one compound selected from the group consisting of:
(i) an ester or polyester of acrylic acid or methacrylic acid with a polyhydric alcohol, said ester or polyester having at least two carbon-to-carbon unsaturated bonds in the molecule,
(ii) an amide or polyamide of acrylic acid or methacrylic acid with a polyamine, said amide or polyamide having at least two carbon-to-carbon unsaturated bonds in the molecule,
(iii) an alkoxysilane having a carbon-to-carbon unsaturated bond, an amino group or a mercapto group in the molecule, and having 1 to 8 carbon atoms in the alkoxy group, and
(iv) triallyl isocyanurate, and
(C) 0 to 200 parts by weight of a filler; the total amount of the fillers in ingredients (a'), (b') and (C) being 0 to 200 parts by weight; and thereafter incorporating in the mixture (D) 0.2 to 10 parts by weight of a peroxide crosslinking agent,
wherein said organopolysiloxane is comprised of recurring units of a siloxane represented by the following average composition formula:

$$R_aSi_{(4-a)/2}$$

wherein R represents a substituted or unsubstituted hydrocarbon, and a is a number of from 1 to 3, and wherein said organopolysiloxane contains at least 100 ppm, based on the weight of the organopolysiloxane, of carbon-to-carbon unsaturated bonds.

9. A process for the preparation of a rubber formulation as claimed in claim 8 wherein said hydrogenated nitrile rubber has an iodine value not larger than 120.

10. A process for the preparation of a rubber formulation as claimed in claim 8 wherein said hydrogenated nitrile rubber composition (a') comprises up to 40 parts by weight, based on 100 parts by weight of the hydrogenated nitrile rubber, of a filler; and said organopolysiloxane composition (b') comprises 30 to 50 parts by weight, based on 100 parts by weight of the organopolysiloxane, of a filler.

11. A process for the preparation of a rubber formulation as claimed in claim 8 wherein the ratio of the shear viscosity of the hydrogenated nitrile rubber composition (a') to the shear viscosity of the organopolysiloxane composition (b') is in the range of from 1/5 to 5/1.

12. A process for the preparation of a rubber formulation as claimed in claim 8 wherein the ratio of the shear viscosity of the hydrogenated nitrile rubber composition (a') to the shear viscosity of the organopolysiloxane composition (b') is in the range of from 2/5 to 2/5.

13. A process for the preparation of a rubber formulation as claimed in claim 8 wherein said fillers in ingredients (a') and (b') are selected from the group consisting of silica and carbon black.

14. A crosslinked rubber formulation which is made by crosslinking a rubber formulation claimed in claim 1 with the peroxide crosslinking agent contained therein.

* * * * *